United States Patent
Yamaji

(10) Patent No.: US 7,924,806 B2
(45) Date of Patent: Apr. 12, 2011

(54) TIME SYNCHRONIZATION SYSTEM

(75) Inventor: Masato Yamaji, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 587 days.

(21) Appl. No.: 12/055,400

(22) Filed: Mar. 26, 2008

(65) Prior Publication Data

US 2008/0240075 A1  Oct. 2, 2008

(30) Foreign Application Priority Data

Mar. 26, 2007  (JP) ................................. 2007-079435

(51) Int. Cl.
*H04J 3/06* (2006.01)
(52) U.S. Cl. ...................................................... 370/350
(58) Field of Classification Search ......................... None
See application file for complete search history.

(56) References Cited

U.S. PATENT DOCUMENTS

| 7,428,229 | B2 * | 9/2008 | Bonta et al. | 370/338 |
| 7,796,549 | B2 * | 9/2010 | Grilli et al. | 370/328 |
| 2007/0248038 | A1 * | 10/2007 | Yamasaki et al. | 370/328 |

FOREIGN PATENT DOCUMENTS

| JP | 2003-273849 A | 9/2003 |
| JP | 2005-286720 A | 10/2005 |
| JP | 2005-322982 A | 11/2005 |
| JP | 2006-3118 A | 1/2006 |
| JP | 2006-234425 A | 9/2006 |

\* cited by examiner

*Primary Examiner* — Anh-Vu Ly
(74) *Attorney, Agent, or Firm* — Sughrue Mion, PLLC

(57) ABSTRACT

In a time synchronization system between wireless nodes, a first wireless node broadcasts a neighbor search packet, adjacent wireless nodes receive the neighbor search packet and then returns an adjacent response packet, the first wireless node selects the mediating wireless node based on the adjacent response packet and then transmits a mediating request packet to the mediating wireless node, the mediating wireless node receives the mediating request packet and then broadcasts a time record request packet, the first wireless node receives the time record request packet and then records reception time, the adjacent wireless nodes receive the time record request packet and then records reception time, the higher-level adjacent wireless node transmits a time notification packet containing the reception time to the first wireless node, and the first wireless node calculates the difference between the recorded reception time and the reception time contained in the time notification packet and then adds the difference to current time.

5 Claims, 18 Drawing Sheets

FIG. 3

| ADJACENT WIRELESS NODE | HIERARCHY | HIGHER-LEVEL ADJACENT WIRELESS NODE |
|---|---|---|
| NN31 | 1 | NONE |
| NN32 | 2 | NN31 |
| NN33 | 3 | NN32 |
| NN34 | 3 | NN32 |

TIME SYNCHRONIZATION SYSTEM

This application is based on and claims priority from Japanese Patent Application No. 2007-079435, filed on Mar. 26, 2007, the entire contents of which are hereby incorporated by reference.

BACKGROUND OF THE INVENTION

1. Technical Field

The present disclosure relates to a time synchronization system between wireless nodes and, more particular, to a time synchronization system between wireless nodes that can perform precise time synchronization without receiving any effect of a communication delay.

2. Related Art

The following references relate to a time synchronization system between wireless nodes in the related art. Japanese Unexamined Patent Publications: JP-A-2003-273849; JP-A-2005-286720 JP-A-2005-322982; JP-A-2006-003118; and JP-A-2006-234425.

FIG. 14 is a block diagram showing an example of a wireless network system using a time synchronization system between wireless nodes in a related art. In FIG. 14, a wireless node 1 performs time synchronization, a time server 2 has the time of day used as the reference, and also a wireless network 100 is shown.

The wireless node 1 is mutually connected to the wireless network 100 and the time server 2 is also mutually connected to the wireless network 100.

The operation shown in FIG. 14 will be described with FIGS. 15 to 18. FIG. 15 is a flowchart describing the operation of the wireless node 1. FIG. 16 is a schematic representation describing the propagation state of data of time information. FIGS. 17 and 18 are schematic representations describing time synchronization.

The wireless node 1 includes wireless communication means for conducting wireless communications through the wireless network 100, storage means for storing programs for operating the wireless node, calculation control means such as a Central Processing Unit (CPU) for controlling the whole wireless node by reading and executing the program (not shown).

Likewise, the time server 2 includes wireless communication means for conducting wireless communications through the wireless network 100, storage means for storing programs for operating the time server, calculation control means such as a CPU for controlling the whole time server by reading and executing the program (not shown).

It is assumed that the wireless node 1 acquires precisely-controlled time information from the time server 2 using Simple Network Time Protocol (SNTP) and then performs time synchronization, where SNTP is a time information transfer protocol and generally often used in a wire network of the Internet, etc.

In FIG. 15, the wireless node 1 transmits a time request to the time server 2 through the wireless network 100 at "S001" in order to request the time server 2 to transmit time information and then waits until reception of a time response from the time server 2 at "S002". At this time, the wireless node 1 records time request transmission time.

For example, the wireless node 1 transmits the time request to the time server 2 through the wireless network 100 as indicated in "RQ01" in FIG. 16. Upon reception of the time request, the time server 2 returns a time response containing time request reception time and time response transmission time to the wireless node 1 through the wireless network 100 as indicated in "RS01" in FIG. 16.

If the wireless node 1 determines at "S002" in FIG. 15 that the time response has been received, the wireless node 1 records the time response reception time and also calculates the time difference between the wireless node 1 and the time server 2 based on the time response, etc., at "S003" in FIG. 15 and adds the calculated time difference to the current time, thereby performing time synchronization at "S004".

For example, it is assumed that the time of the wireless node 1 is 1 second ahead the time of the time server 2 as shown in FIG. 17. It is also assumed that the propagation time of the time request from the wireless node 1 to the time server 2 and the propagation time of the time response from the time server 2 to the wireless node 1 are each 1 second.

If the wireless node 1 transmits a time request to the time server 2 at the time "TM11" in FIG. 17, the time request is received at the time server 2 at the time "TM12" in FIG. 17 thorough 1 second of the propagation time as indicated in "RQ01" in FIG. 17.

In the case, the time of the wireless node 1 is 1 second ahead the time of the time server 2 and therefore if the time request transmission time "TM11" is "0:02" in the wireless node time, the time request reception time "TM12" is "0:02" in the time server time.

If the time server 2 transmits a time response (containing the time request reception time and the time response transmission time) to the wireless node 1 at the time "TM13" in FIG. 17, the time response is received at the wireless node 1 at the time "TM14" in FIG. 17 through 1 second of the propagation time as indicated in "RS01" in FIG. 17.

In this case, the time of the wireless node 1 is 1 second ahead the time of the time server 2 and therefore if the time response transmission time "TM13" is "0:03" in the time server time, the time response reception time "TM14" is "0:05" in the wireless node time.

In this case, time difference ΔT is represented by the following expression:

$$\Delta T = \{(TM12 - TM11) + (TM13 - TM14)\}/2 \qquad (1)$$

and the time difference ΔT is added to the current time, thereby performing time synchronization.

For example, in FIG. 17, the time difference ΔT is calculated as follows:

$$\begin{aligned}\Delta T &= \{(0{:}02 - 0{:}02) + (0{:}03 - 0{:}05)\}/2 \qquad (2)\\ &= -0{:}02/2\\ &= -0{:}01\end{aligned}$$

and the time difference ΔT is added to the current time, e.g., time "0:06" indicated by "TM15" in FIG. 17, whereby it is made possible to correct the current time of the wireless node 1 to "0:05" to synchronize the time with the current time "0:05" of the time server 2.

Likewise, for example, it is assumed that the time of the wireless node 1 is 1 second behind the time of the time server 2 as shown in FIG. 18. It is also assumed that the propagation time of the time request from the wireless node 1 to the time server 2 and the propagation time of the time response from the time server 2 to the wireless node 1 are each 1 second.

If the wireless node 1 transmits a time request to the time server 2 at the time "TM21" in FIG. 18, the time request is received at the time server 2 at the time "TM22" in FIG. 18 through 1 second of the propagation time as indicated in "RQ01" in FIG. 18.

In this case, the time of the wireless node 1 is 1 second behind the time of the time server 2 and therefore if the time request transmission time "TM21" is "0:01" in the wireless node time, the time request reception time "TM22" is "0:03" in the time server time.

If the time server 2 transmits a time response (containing the time request reception time and the time response transmission time) to the wireless node 1 at the time "TM23" in FIG. 18, the time response is received at the wireless node 1 at the time "TM24" in FIG. 18 through 1 second of the propagation time as indicated in "RS01" in FIG. 18.

In this case, the time of the wireless node 1 is 1 second behind the time of the time server 2 and therefore if the time response transmission time "TM23" is "0:04" in the time server time, the time response reception time "TM24" is "0:04" in the wireless node time.

For example, in FIG. 18, the time difference ΔT is calculated as follows:

$$\Delta T = \{(0{:}03 - 0{:}01) + (0{:}04 - 0{:}04)\}/2 \quad (3)$$
$$= 0{:}02/2$$
$$= 0{:}01$$

and the time difference ΔT is added to the current time, e.g., time "0:05" indicated by "TM25" in FIG. 18, whereby it is made possible to correct the current time of the wireless node 1 to "0:06" thereby to synchronize the time with the current time "0:06" of the time server 2.

Consequently, the wireless node 1 calculates the time difference ΔT based on the time request transmission time, the time response reception time, the time request reception time at the time server 2 and the time response transmission time from the time server 2, and then add the time difference to the current time, thereby performing time synchronization with the time server 2.

In the related art example shown in FIG. 14, however, the SNTP is based on the assumption that the time request propagation time from the wireless node 1 to the time server 2 and the time response propagation time from the time server 2 to the wireless node 1 are equal to each other. The SNTP is effective in an environment of a wire network in which the bandwidth is wide and high-speed communications is available, but the following problems occur in an environment like a wireless network:

Namely, in the wireless network where data communications are performed using space of different wireless communication and noise, if different wireless communication interrupts transmission just before data transmission, the data transmission enters a wait state and is executed after completion of the interrupting different wireless communication.

Thus, the transmission time of the time request or the time response (the time at which an attempt is made to transmit the time request or the time response) and the time at which the data can be transmitted actually are not coincident with each other and thus the accuracy of the time synchronization is degraded.

In a wireless network in a multi-hop environment, it is not guaranteed that the time request propagation path and the time response propagation path are coincident with each other, and further the delay time in a relay node always changes according to the processing capability of the relay node, the processing state of any other data, etc.

Thus, as the presumption of using the SNTP, the assumption is not established that the time request propagation time from the wireless node 1 to the time server 2 and the time response propagation time from the time server 2 to the wireless node 1 are equal to each other and, as a result, the accuracy of the time synchronization is degraded.

SUMMARY OF THE INVENTION

One or more exemplary embodiments of the present invention provide a time synchronization system between wireless nodes that can perform precise time synchronization without receiving any effect of a communication delay, and a wireless network system.

According to one or more exemplary embodiments of the present invention, a time synchronization system between wireless nodes, the time synchronization system comprises:

a first wireless node performing time synchronization and mutually connected to a wireless network;

adjacent wireless nodes adjacent to the first wireless node and mutually connected to the wireless network, said adjacent wireless nodes comprising a mediating wireless node and a higher-level adjacent wireless node, wherein (i) the first wireless node broadcasts a neighbor search packet, (ii) the adjacent wireless nodes receive the neighbor search packet and then returns an adjacent response packet, (iii) the first wireless node selects the mediating wireless node based on the adjacent response packet and then transmits a mediating request packet to the mediating wireless node, (iv) the mediating wireless node receives the mediating request packet and then broadcasts a time record request packet, (v) the first wireless node receives the time record request packet and then records reception time, (vi) the adjacent wireless nodes receive the time record request packet and then records reception time, (vii) the higher-level adjacent wireless node transmits a time notification packet containing the reception time to the first wireless node, and (viii) the first wireless node calculates the difference between the recorded reception time and the reception time contained in the time notification packet and then adds the difference to current time.

According to one or more exemplary embodiments of the present invention, the adjacent response packet contains: hierarchy information; and information on the higher-level adjacent wireless node.

According to one or more exemplary embodiments of the present invention, the adjacent response packet contains: the communication quality at the time of reception of the neighbor search packet; and time at which the last time synchronization was performed.

According to one or more exemplary embodiments of the present invention, the time record request packet contains: information on the first wireless node; and information on the higher-level adjacent wireless node.

According to one or more exemplary embodiments of the present invention, the adjacent wireless nodes receiving the neighbor search packet waits for a predetermined time and then returns the adjacent response packet.

According to the present invention, precise time synchronization can be performed without receiving any effect of a communication delay, etc.

Other aspects and advantages of the invention will be apparent from the following description, the drawings and the claims.

BRIEF DESCRIPTION OF THE DRAWINGS

In the accompanying drawings:

FIG. 3 is a table listing information on the hierarchy and the higher-level adjacent wireless node of each adjacent wireless node;

DETAILED DESCRIPTION

Figure 1:
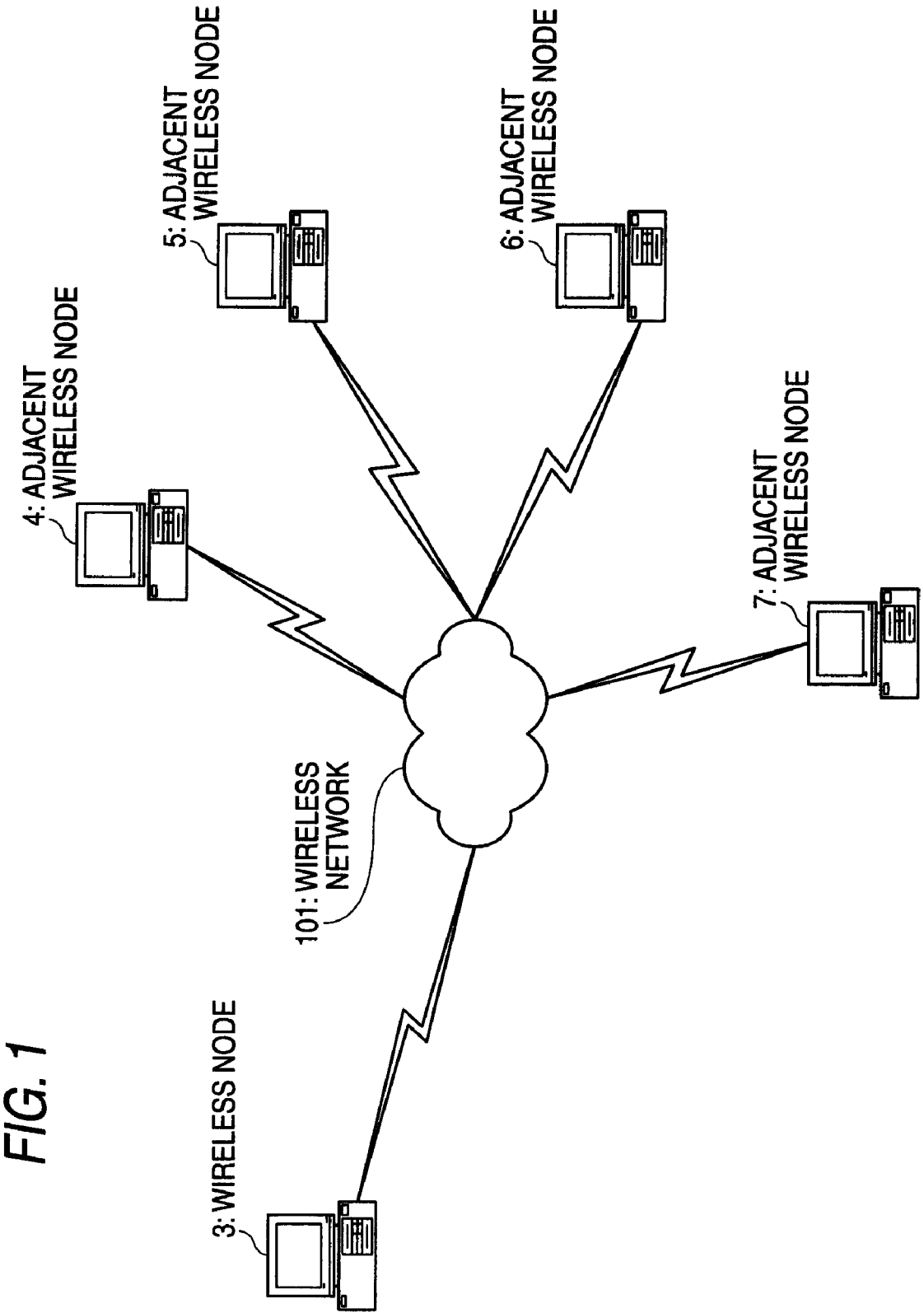
FIG. 1 is a block diagram showing an example of a wireless network system using a time synchronization system between wireless nodes according to the present invention.

Exemplary embodiments of the present invention will be described in detail with reference to the accompanying drawings hereinafter. FIG. 1 is a block diagram showing an example of a wireless network system using a time synchronization system between wireless nodes according to the present invention.

In FIG. 1, a wireless node 3 performs time synchronization, adjacent wireless nodes 4 to 7 have already performed time synchronization or have the reference time, and a wireless network 101 is shown.

The wireless node 3 is mutually connected to the wireless network 101 and the adjacent wireless nodes 4 to 7 are also mutually connected to the wireless network 101.

Figure 2:
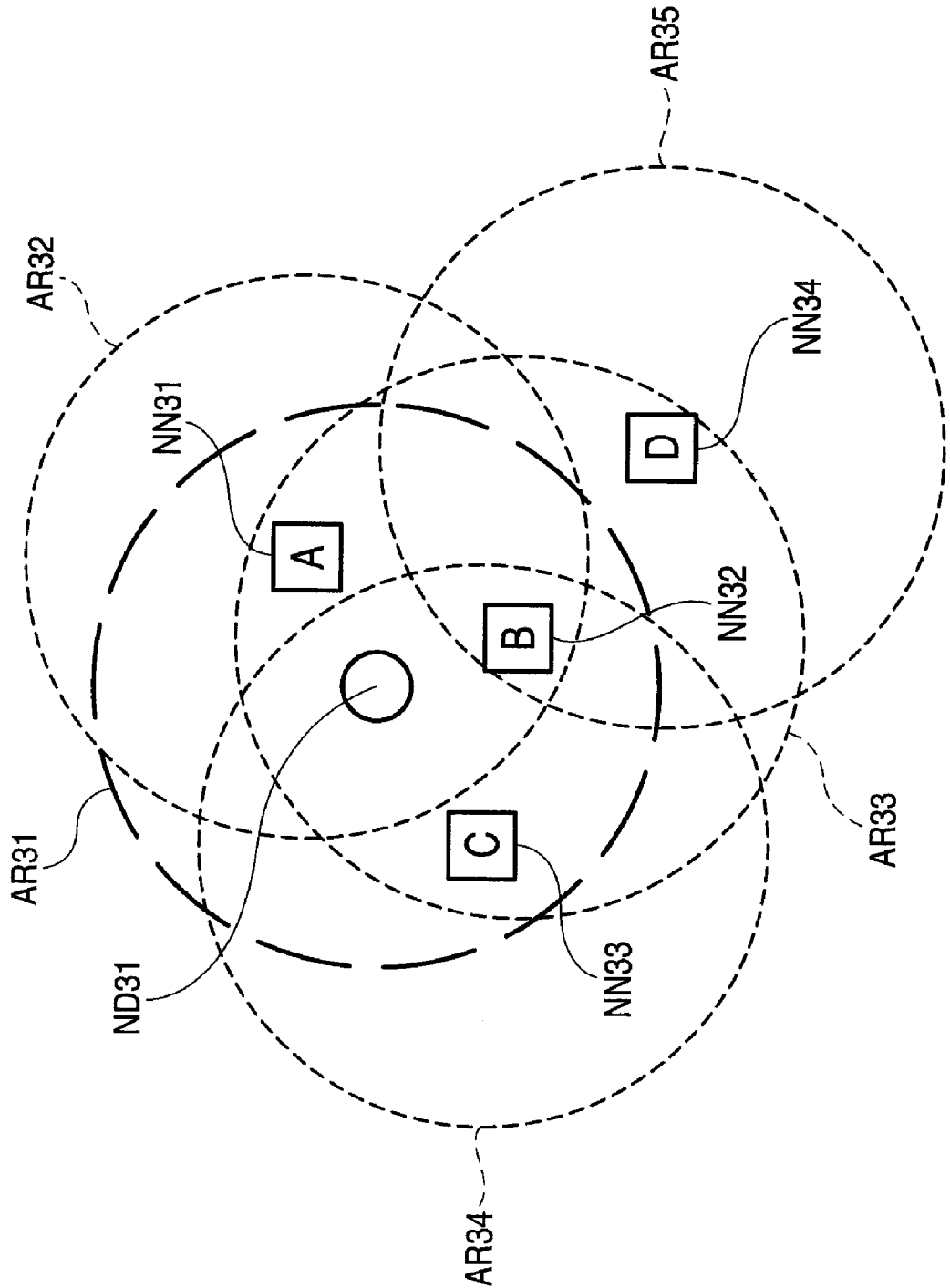
FIG. 2 is a schematic representation showing the positional relationship between a wireless node and its adjacent wireless nodes.
Figure 4:
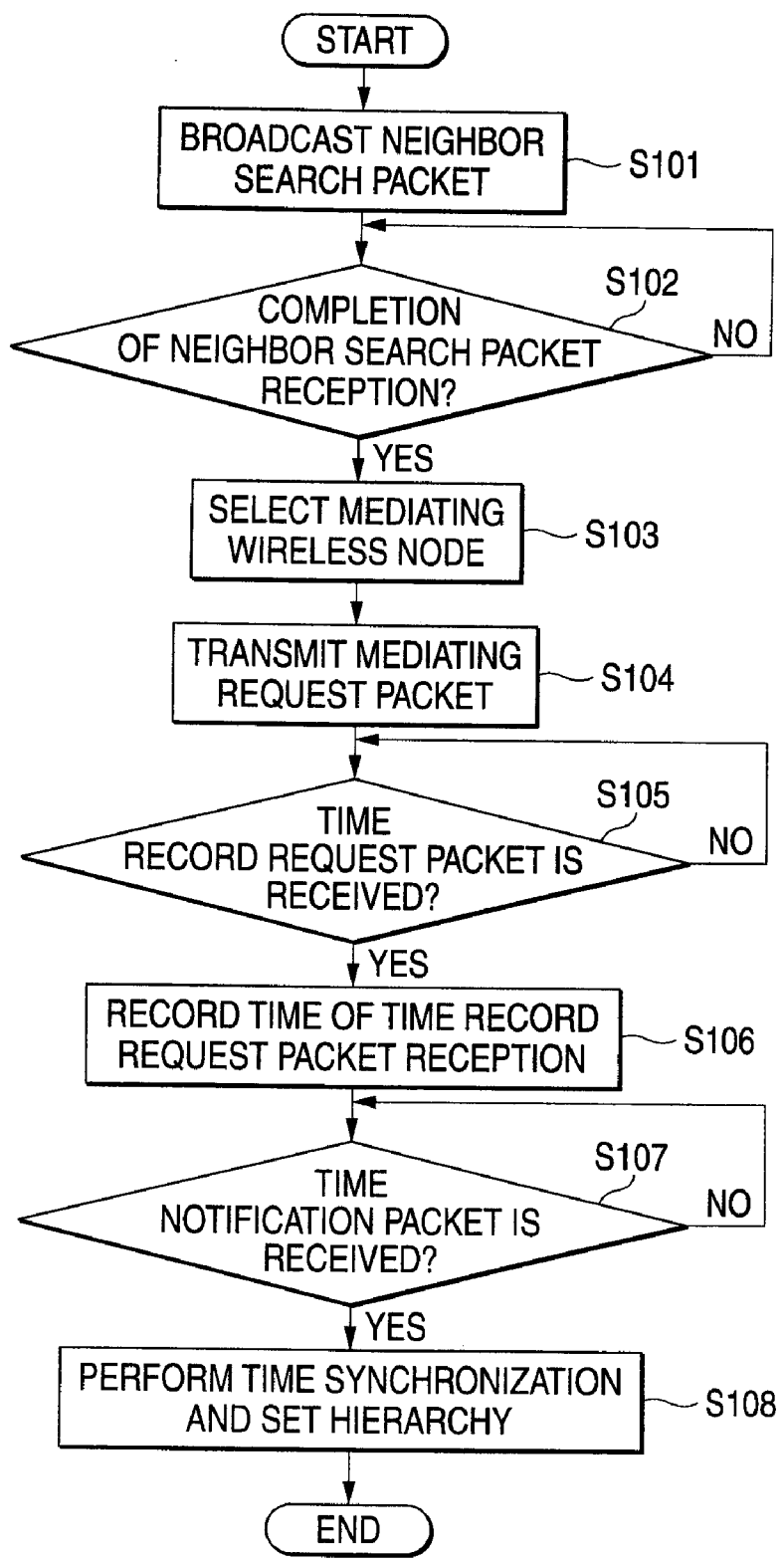
FIG. 4 is a flowchart describing the operation of the wireless node.

The operation of the embodiment shown in FIG. 1 will be described with FIGS. 2 to 13. FIG. 2 is a schematic representation showing the positional relationship between the wireless node 3 and the adjacent wireless nodes. FIG. 3 is a table listing information of the hierarchy and the higher-level adjacent wireless node of each adjacent wireless node. FIG. 4 is a flowchart describing the operation of the wireless node 3. FIGS. 5, 7, 8, 10, and 12 are schematic representations describing the packet propagation state. FIGS. 6, 9, and 11 are flowcharts describing the operation of the adjacent wireless nodes. FIG. 13 is a schematic representation describing time synchronization.

The wireless node 3 includes wireless communication means for conducting wireless communications through the wireless network 101, storage means for storing programs for operating the wireless node, calculation control means such as a CPU for controlling the whole wireless node by reading and executing the program (not shown).

Likewise, each of the adjacent wireless nodes 4 to 7 includes wireless communication means for conducting wireless communications through the wireless network 101, storage means for storing programs for operating the adjacent wireless node, calculation control means such as a CPU for controlling the whole adjacent wireless node by reading and executing the program (not shown).

In FIG. 2, ND31 corresponds to the wireless node 3 in FIG. 1 and AR31 denotes the radio wave arrival range from the wireless node "ND31" in FIG. 2.

Likewise, in FIG. 2, NN31, NN32, NN33, and NN34 correspond to the adjacent wireless nodes 4, 5, 6, and 7 in FIG. 1 and "AR32", "AR33", "AR34", and "AR35" denote the radio wave arrival ranges from the adjacent wireless nodes "NN31" to "NN34" in FIG. 2.

For example, the adjacent wireless nodes "NN31" to "NN33" exist in the radio wave arrival range from the wireless node "ND31" in FIG. 2 and thus the wireless node "ND31" can perform direct wireless communications with the adjacent wireless nodes "NN31" to "NN33" in FIG. 2.

For example, the adjacent wireless node "NN34" does not exist in the radio wave arrival range from the wireless node "ND31" in FIG. 2 and thus the wireless node "ND31" cannot perform direct wireless communications with the adjacent wireless node indicated "NN34" in FIG. 2.

Meanwhile, the adjacent wireless node "NN31" is at level 1 of the hierarchy and does not have any higher-level adjacent wireless node as shown in FIG. 3, which means that the adjacent wireless node NN31 has the reference time.

The adjacent wireless node "NN32" is at level 2 of the hierarchy and the higher-level adjacent wireless node is the adjacent wireless node "NN31" as shown in FIG. 3, which means that the adjacent wireless node "NN32" is synchronized with the reference time that the adjacent wireless node "NN31" has.

Likewise, the adjacent wireless nodes "NN33" and "NN34" are at level 3 of the hierarchy and the higher-level adjacent wireless node is the adjacent wireless node "NN32" as shown in FIG. 3, which means that the adjacent wireless nodes "NN33" and "NN34" are synchronized with the already-synchronized time that the adjacent wireless node "NN32" has.

First of all, in a neighbor search step, the wireless node 3 broadcasts a neighbor search packet to the adjacent wireless nodes existing in the radio wave arrival range at "S101" in FIG. 4, and also waits for any time until completion of reception of an adjacent response packet from the adjacent wireless nodes existing in the radio wave arrival range at "S102" in FIG. 4.

Figure 5:
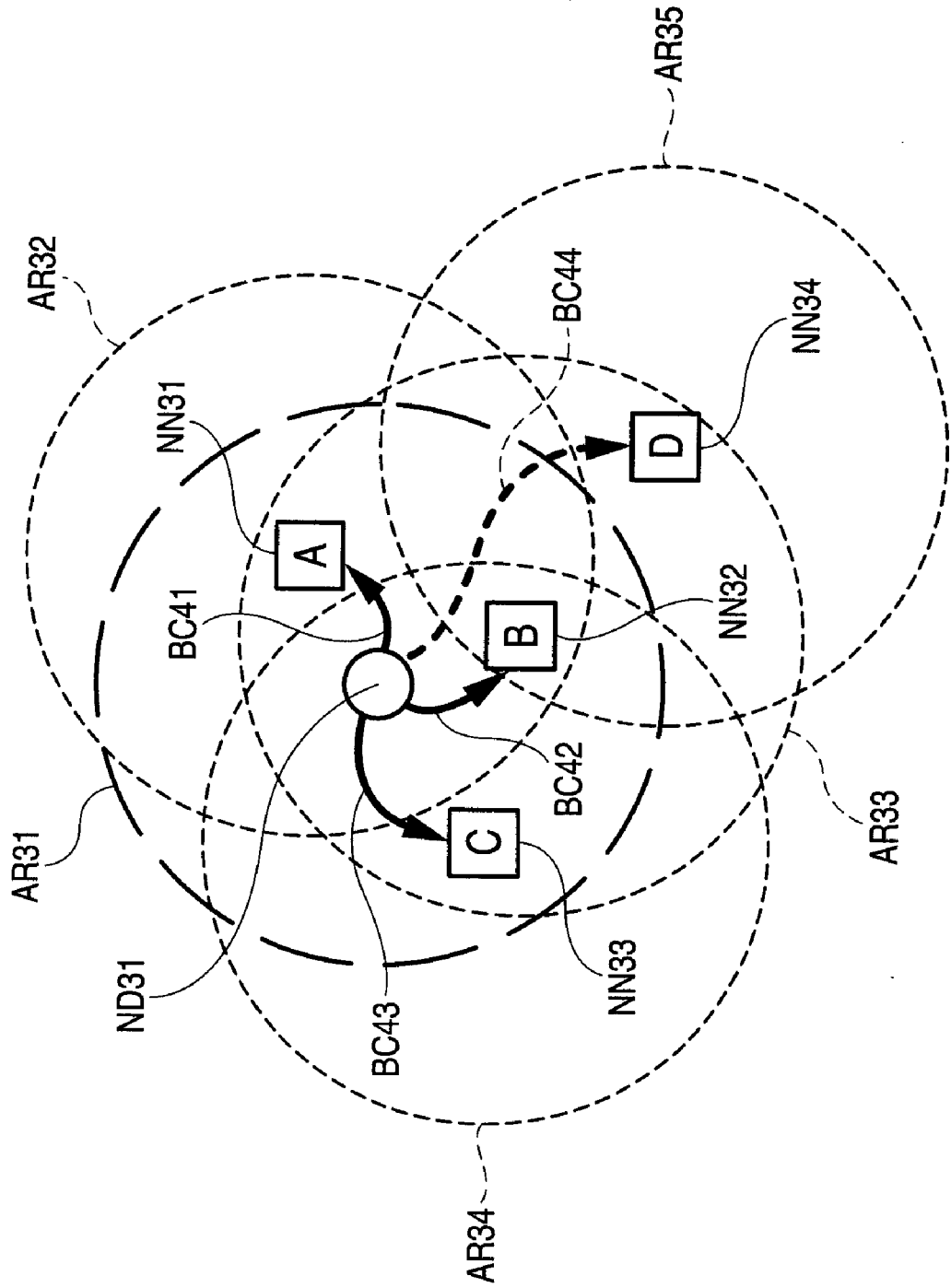
FIG. 5 is a schematic representation describing the packet propagation state.
Figure 6:
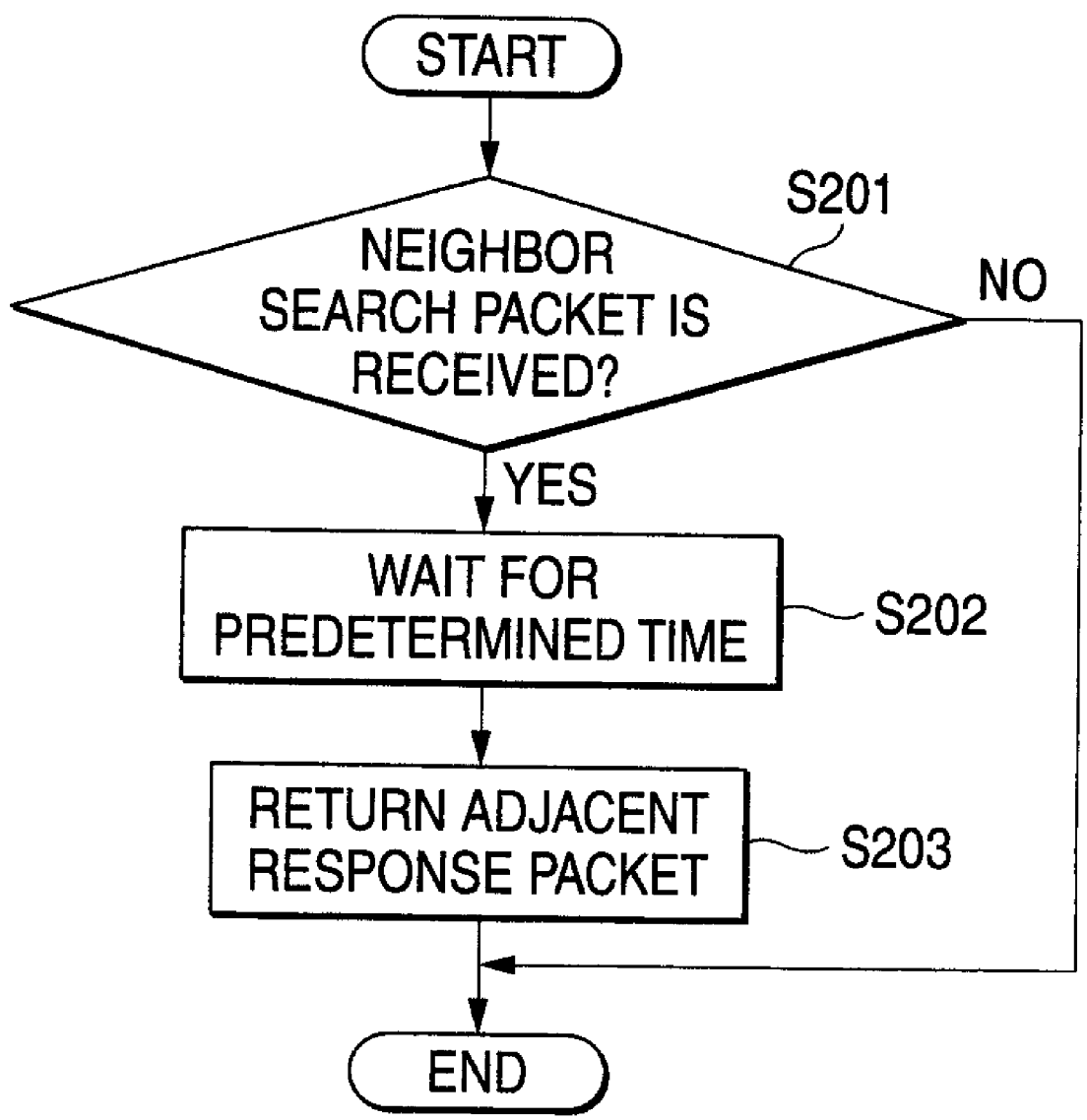
FIG. 6 is a flowchart describing the operation of each adjacent wireless node.

For example, the wireless node "ND31" broadcasts a neighbor search packet to the adjacent wireless nodes "NN31", "NN32", and "NN33" as shown in "BC41", "BC42", and "BC43" in FIG. 5.

However, the adjacent wireless node "NN34" exists beyond the radio wave arrival range of the wireless node "ND31" and therefore the neighbor search packet does not arrive as shown in "BC44" in FIG. 5.

Meanwhile, at "S201" in FIG. 6, the adjacent wireless node determines whether or not such a neighbor search packet has been received. If the adjacent wireless node determines that a neighbor search packet has been received, the adjacent wireless node waits for a predetermined time at "S202" in FIG. 6 and then returns an adjacent response packet, containing information on the hierarchy level of the adjacent wireless node and information on the higher-level adjacent wireless node as shown in FIG. 3, to the wireless node transmitting the neighbor search packet at "S203" in FIG. 6.

Figure 7:
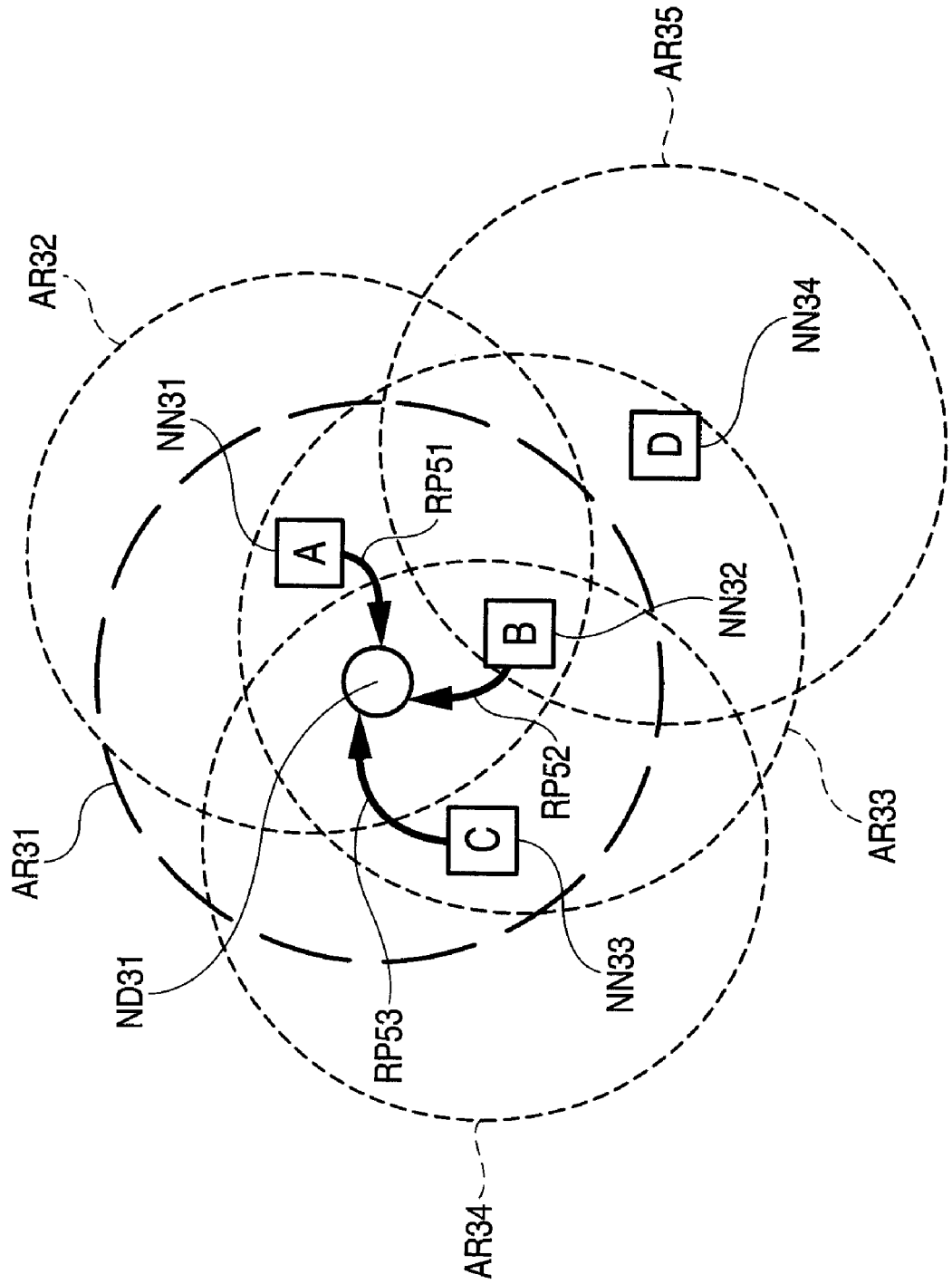
FIG. 7 is a schematic representation describing the packet propagation state.

For example, the adjacent wireless nodes "NN31", "NN32", and "NN33" return an adjacent response packet to the wireless node "ND31" as shown in "RP51", "RP52" and "RP53" in FIG. 7.

The adjacent response packet from the adjacent wireless node "NN31" contains "1" as the hierarchy information and "none" as the higher-level adjacent wireless node information as shown in FIG. 3, and the adjacent response packet from the adjacent wireless node "NN32" contains "2" as the hierarchy information and "NN31" as the higher-level adjacent wireless node information as shown in FIG. 3.

Likewise, the adjacent response packet from the adjacent wireless node "NN33" contains "3" as the hierarchy information and "NN32" as the higher-level adjacent wireless node information as shown in FIG. 3.

Second, in a selection step of a mediating wireless node, if the wireless node 3 determines that reception of the adjacent response packets is complete at "S102" in FIG. 4, the wireless node 3 selects the optimum adjacent wireless node as the mediating wireless node based on the received adjacent response packets at "S103" in FIG. 4, transmits a mediating request packet to the selected adjacent wireless node at "S104" in FIG. 4, and waits until reception of a time record request packet at "S105" in FIG. 4.

For example, as seen in FIG. 3, the adjacent wireless node having the reference time of the wireless network (the time to synchronize with) is the adjacent wireless node "NN31" in FIG. 7 and the adjacent wireless node "NN31" is not suited for the mediating wireless node and therefore the wireless node "ND31" selects the adjacent wireless node whose hierarchy information is "2" or less and is the smallest.

That is, if the adjacent wireless node information is as shown in FIG. 3, the wireless node "ND31" in FIG. 7 selects the adjacent wireless node "NN32" whose hierarchy information is "2" as the mediating wireless node.

Figure 8:
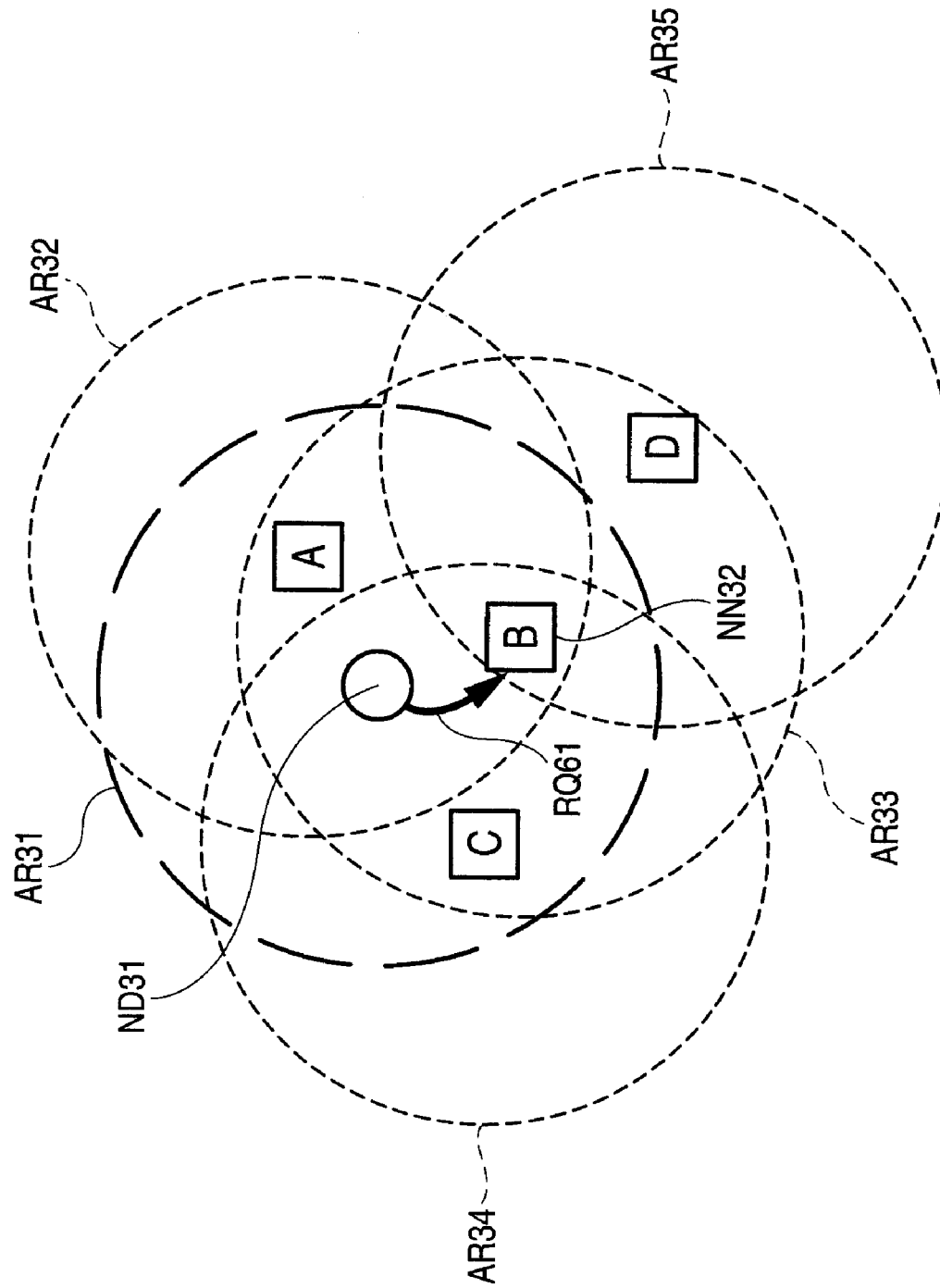
FIG. 8 is a schematic representation describing the packet propagation state.
Figure 9:
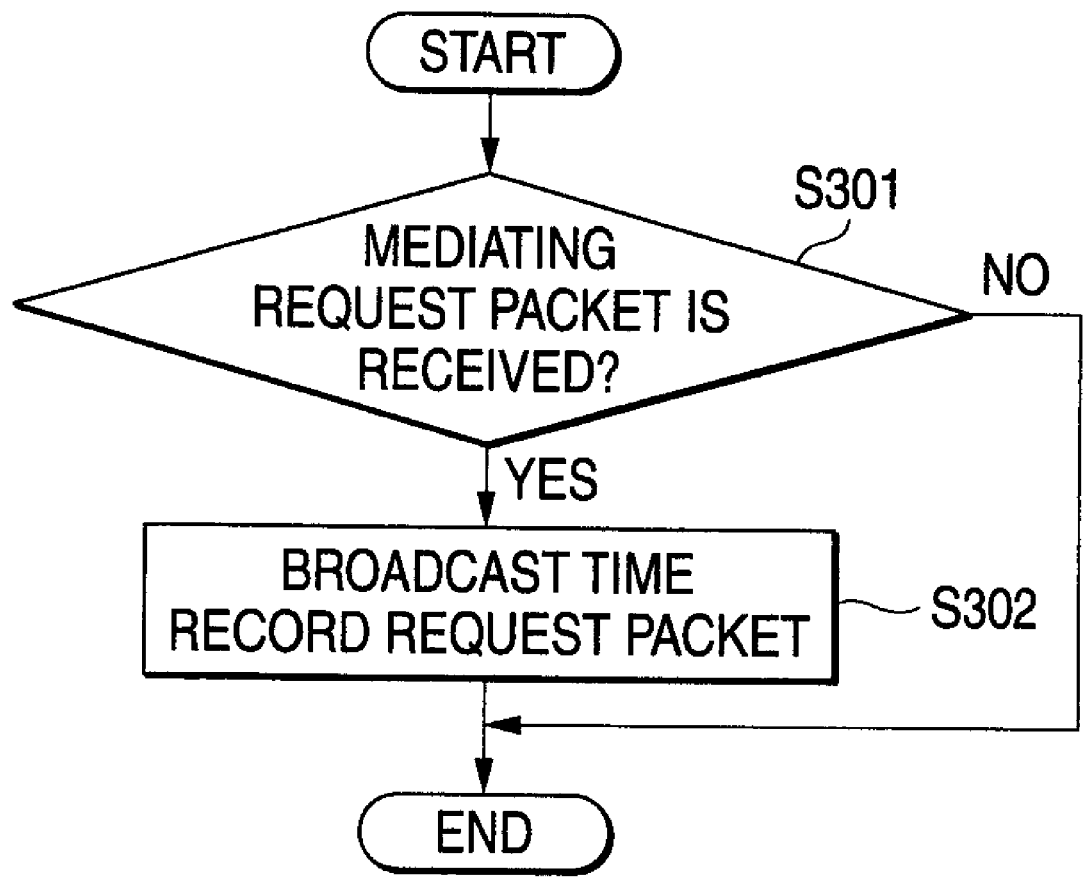
FIG. 9 is a flowchart describing the operation of each adjacent wireless node.

Thus, for example, the wireless node "ND31" transmits a mediating request packet to the adjacent wireless node "NN32" selected as the mediating wireless node as indicated in "RQ61" in FIG. 8.

At "S301" in FIG. 9, the adjacent wireless node determines whether or not such a mediating request packet has been received. If the adjacent wireless node determines that a mediating request packet has been received, the adjacent wireless node broadcasts a time record request packet at "S302" in FIG. 9.

Figure 10:
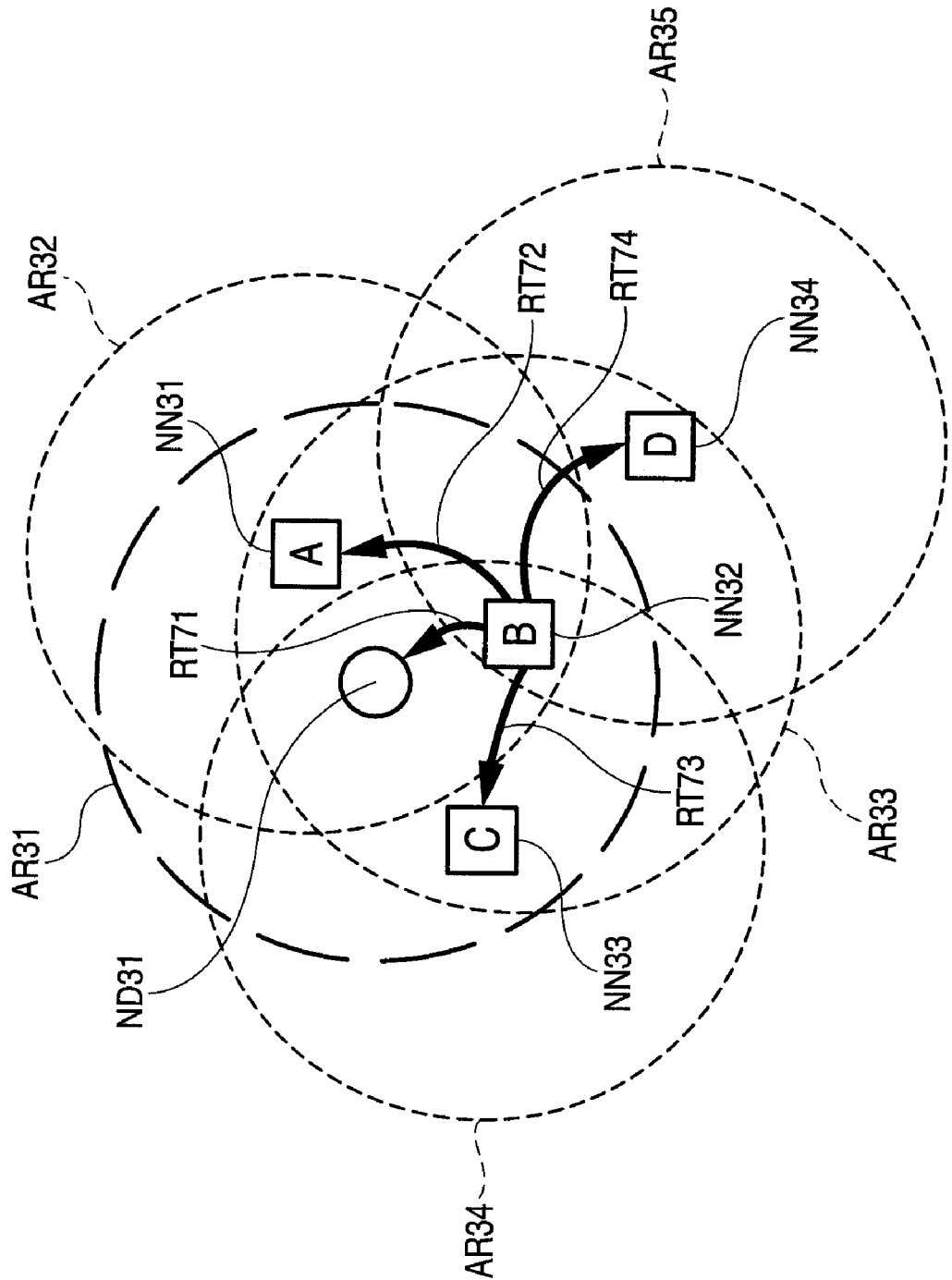
FIG. 10 is a schematic representation describing the packet propagation state.
Figure 11:
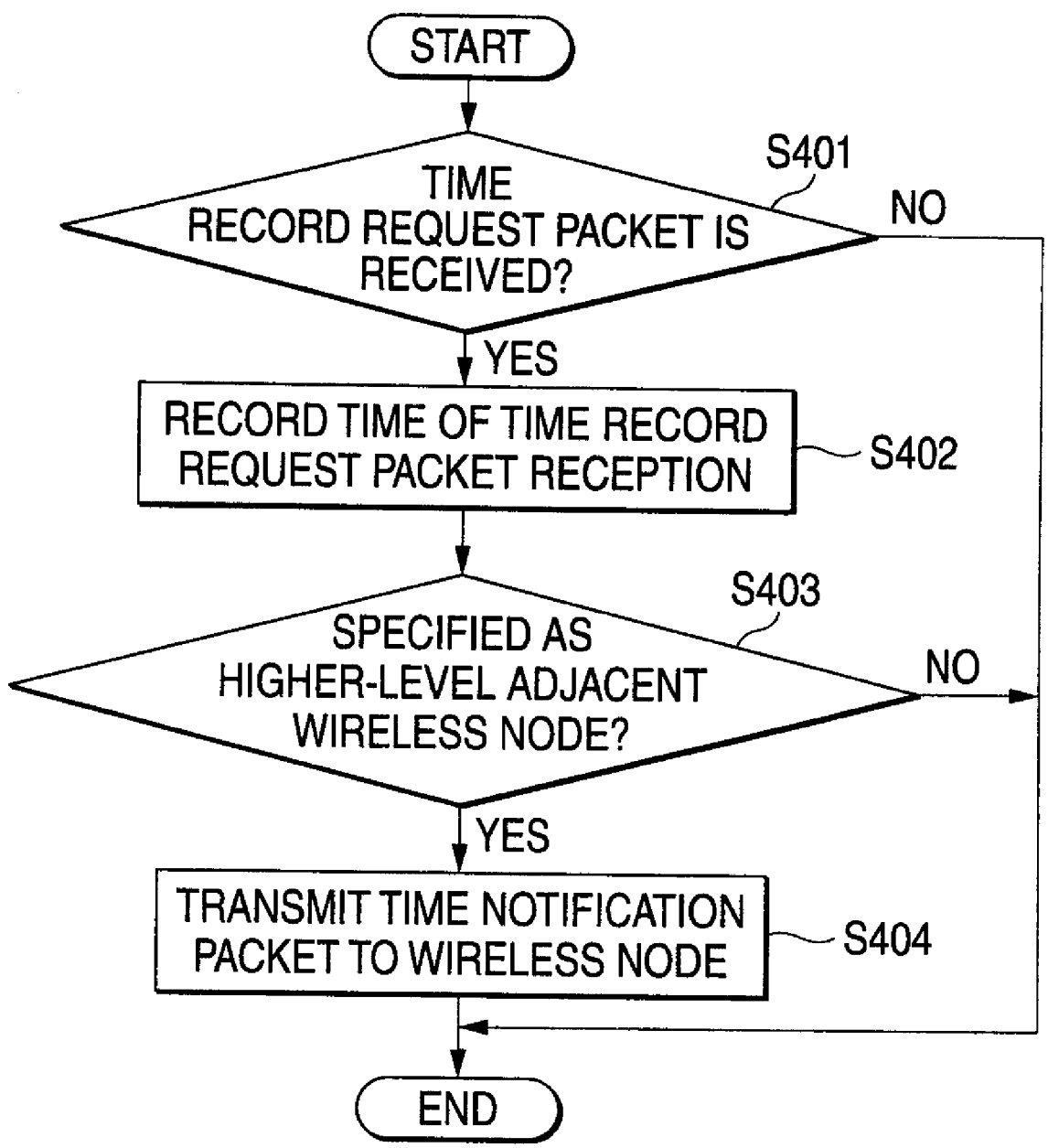
FIG. 11 is a flowchart describing the operation of each adjacent wireless node.

For example, the adjacent wireless node (mediating wireless node) "NN32" broadcasts a time record request packet to the wireless node and the adjacent wireless nodes "ND31", "NN31", "NN33", and "NN34" in FIG. 10 as indicated in "RT71", "RT72", "RT73", and "RT74" in FIG. 10.

The time record request packet from the adjacent wireless node "NN32" in FIG. 10 contains "ND31" as information on the transmission source of the mediating request packet and "NN31" as information on the adjacent wireless node specified as the higher-level adjacent wireless node.

Third, in a step of time record, if the wireless node 3 determines that a time record request packet has been received at "S105" in FIG. 4, the wireless node 3 records the time of reception of the time record request packet at "S106" in FIG. 4 and also waits until reception of a time notification packet from the higher-level adjacent wireless node at "S107" in FIG. 4.

Meanwhile, each adjacent wireless node not selected as the mediating wireless node determines whether or not such a time record request packet has been received at "S401" in FIG. 11. If the adjacent wireless node determines that a time record request packet has been received, the adjacent wireless node records the time of reception of the time record request packet at "S402" in FIG. 11.

At "S403" in FIG. 11, the adjacent wireless node determines whether or not the information on the adjacent wireless node specified as the higher-level adjacent wireless node in the time record request packet matches the information of itself. In other words, the adjacent wireless node determines whether or not the adjacent wireless node is specified as the higher-level adjacent wireless node. If the adjacent wireless node is specified as the higher-level adjacent wireless node, it transmits a time notification packet containing the previously recorded time of reception of the time record request packet to the transmission source of the mediating request packet at "S404" in FIG. 11.

Figure 12:
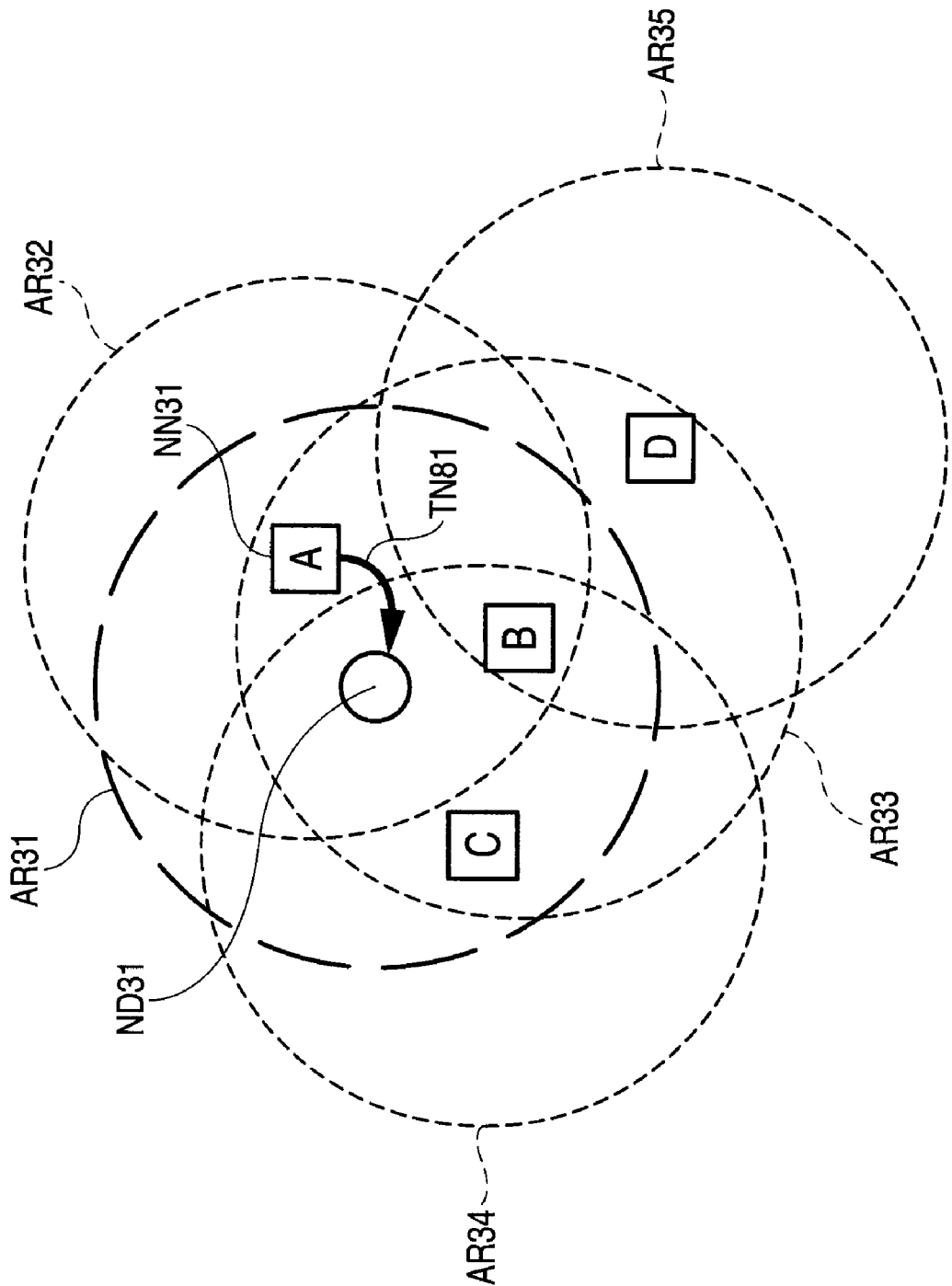
FIG. 12 is a schematic representation describing the packet propagation state.
Figure 13:
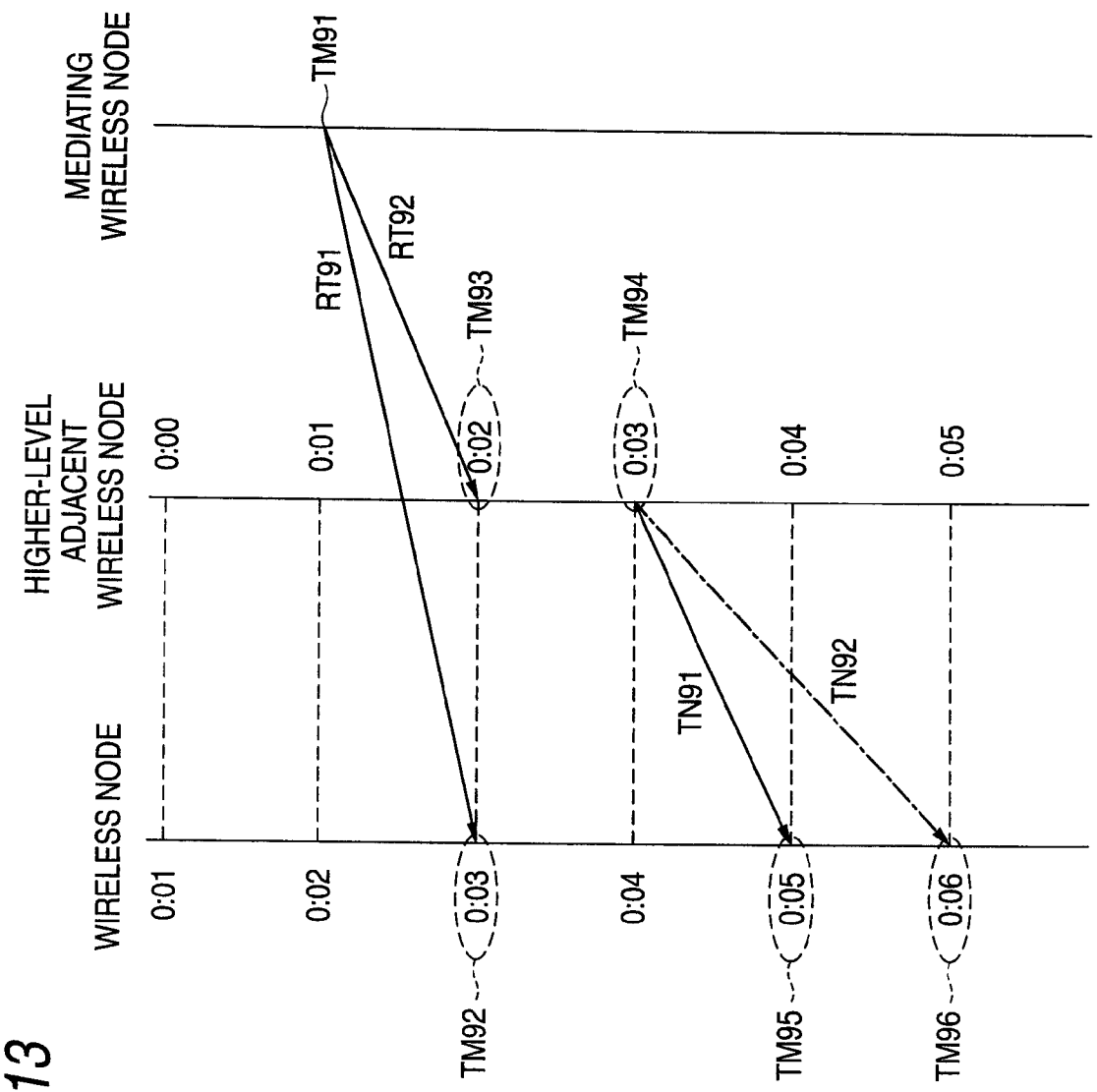
FIG. 13 is a schematic representation describing time synchronization.
Figure 14:
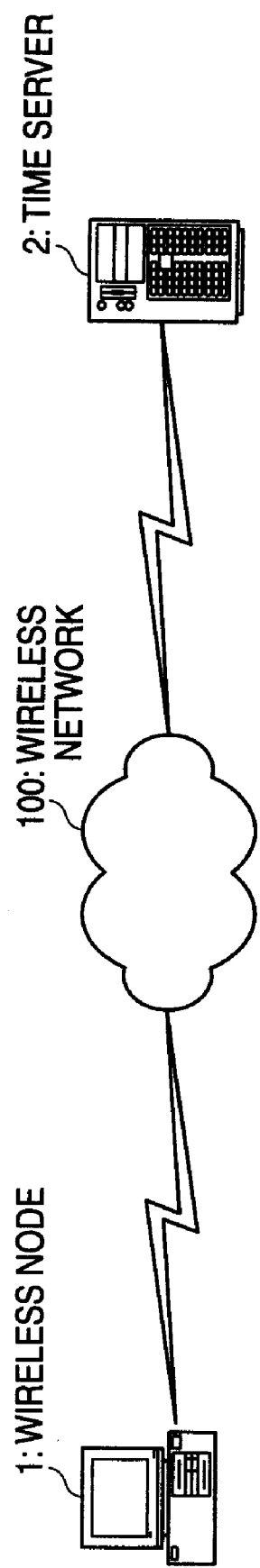
FIG. 14 is a block diagram showing an example of a wireless network system using a time synchronization system between wireless nodes in a related art.
Figure 15:
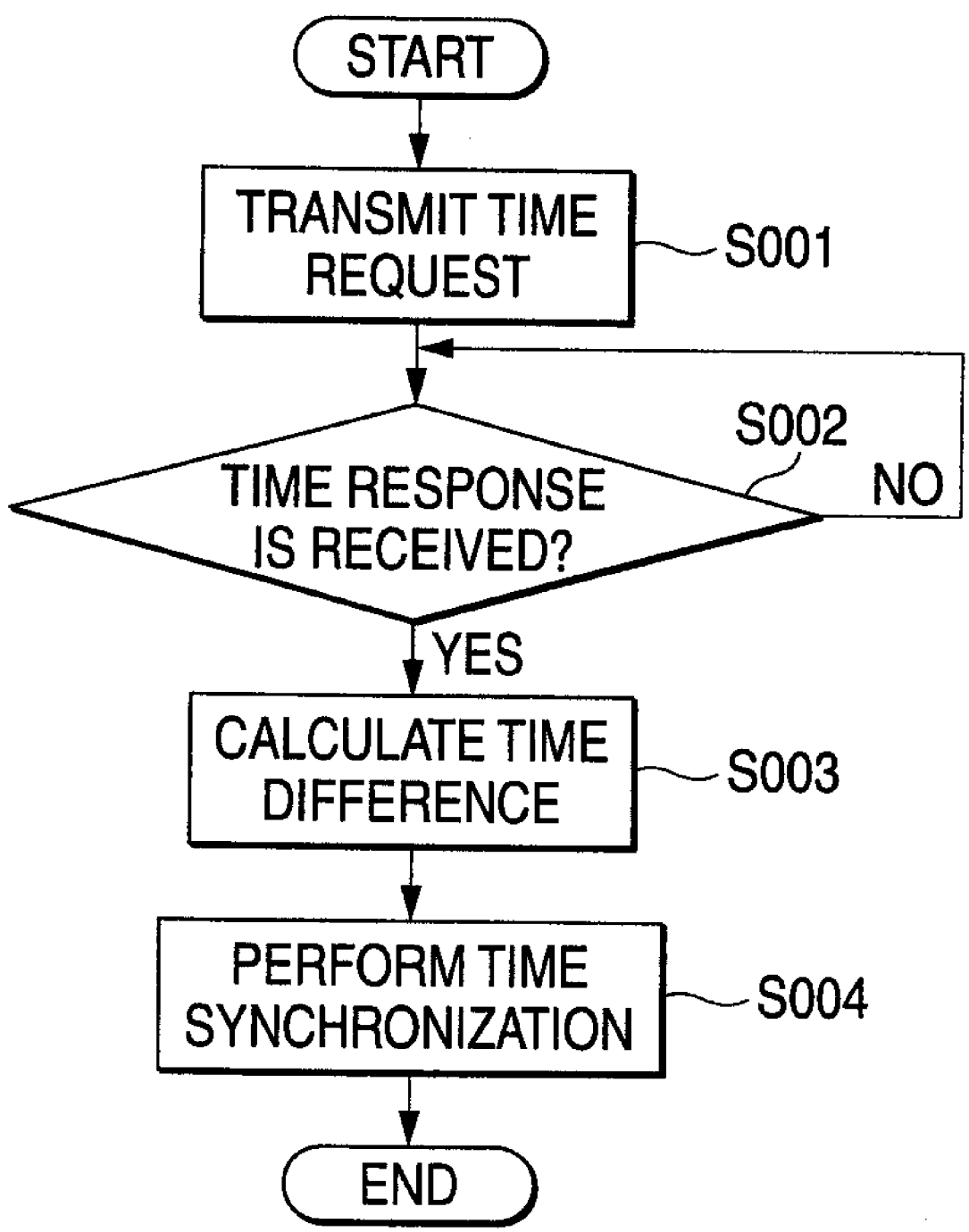
FIG. 15 is a flowchart describing the operation of the wireless node in the related art.
Figure 16:
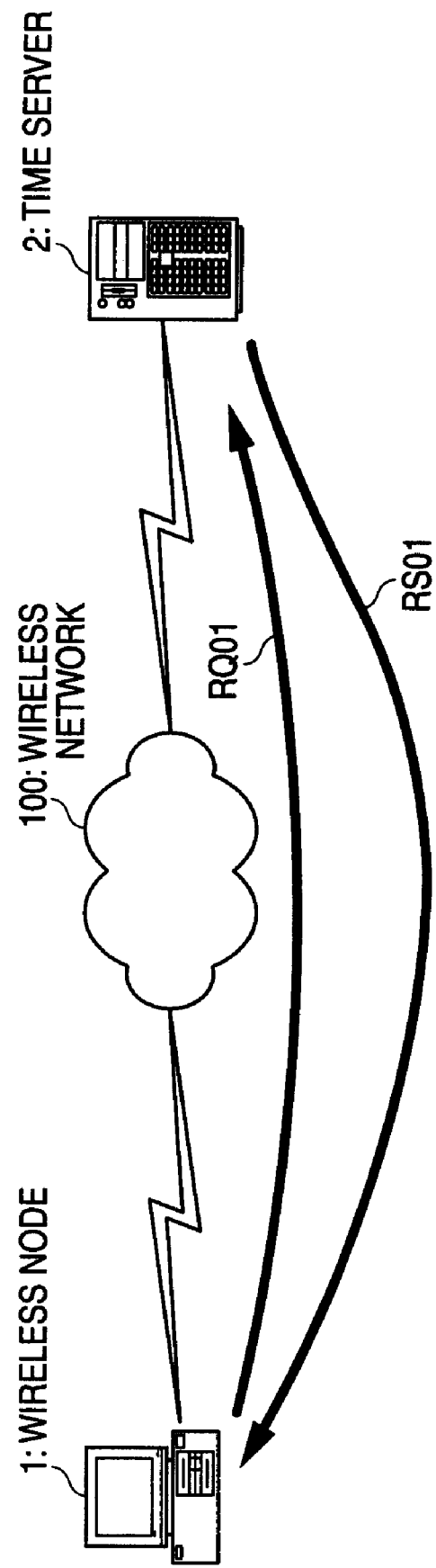
FIG. 16 is a schematic representation describing the propagation state of data of time information in the related art.
Figure 17:
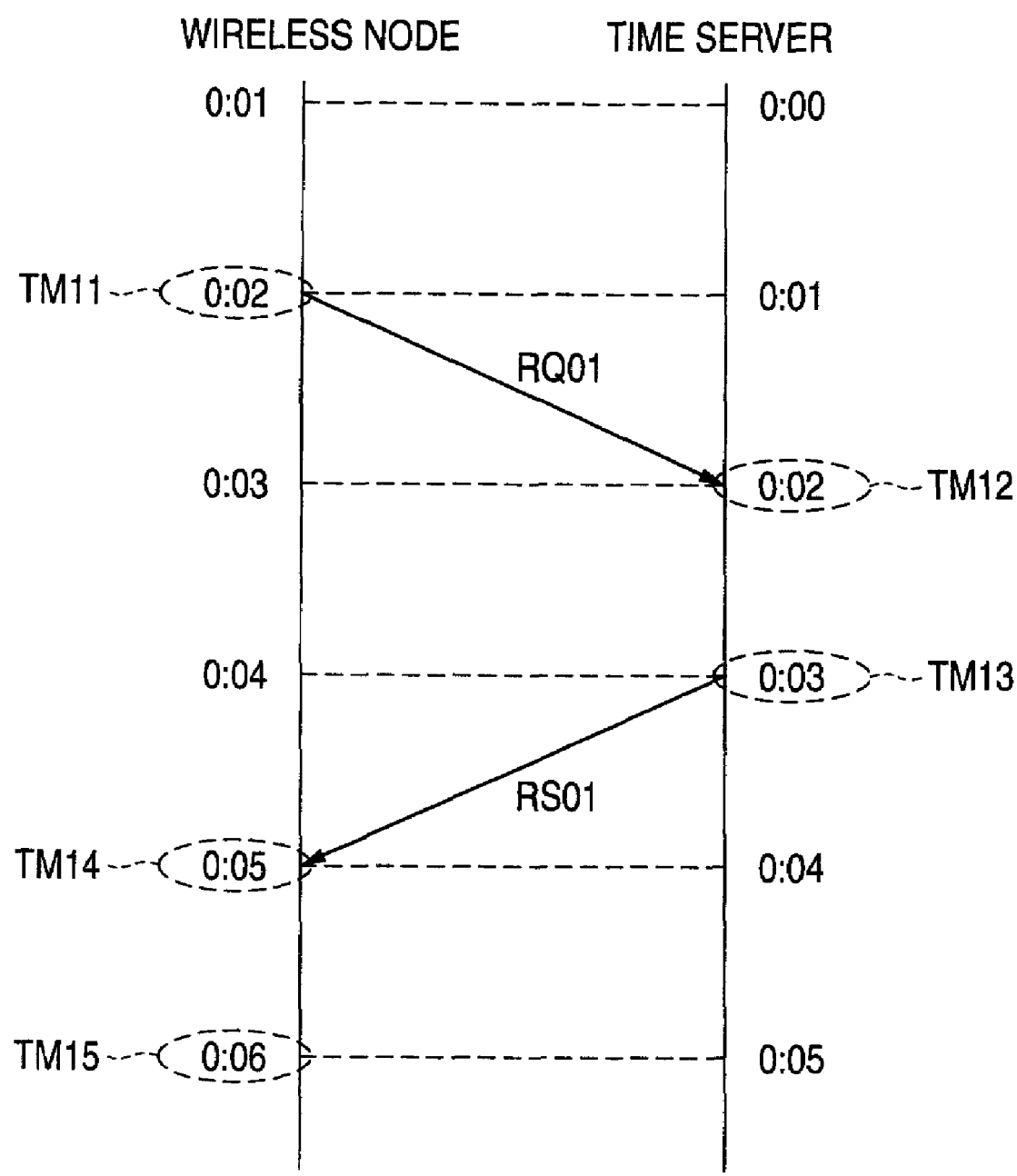
FIG. 17 is a schematic representation describing time synchronization in the related art.
Figure 18:
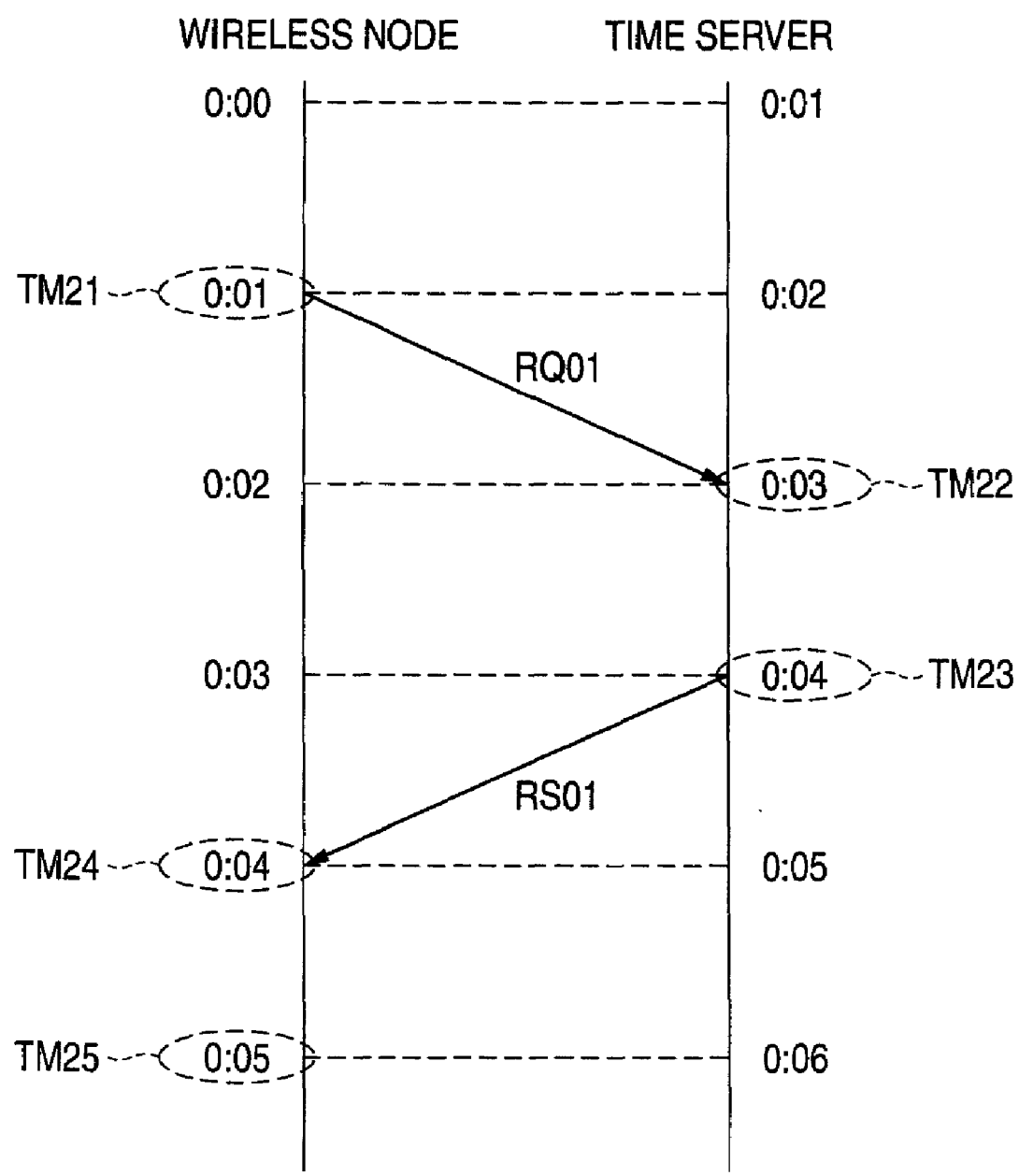
FIG. 18 is a schematic representation describing time synchronization in the related art.

For example, the adjacent wireless node (higher-level adjacent wireless node) "NN31" transmits a time notification packet to the wireless node (the transmission source of the mediating request packet) "ND31" as indicated in "TN81" in FIG. 12.

Last, in a step of time synchronization, if the wireless node 3 determines that a time notification packet has been received at "S107" in FIG. 4, the wireless node 3 calculates the difference between the time of reception of the time record request packet, recorded by the wireless node 3 and the time of reception of the time record request packet, recorded in the higher-level adjacent wireless node contained in the time notification packet and adds the time difference to the current time, thereby performing time synchronization and setting the hierarchy at "S108" in FIG. 4.

For example, it is assumed that the time of the wireless node (the wireless node "ND31" in FIG. 12) is one second ahead the time of the higher-level adjacent wireless node (the higher-level adjacent wireless node "NN31" in FIG. 12) as shown in FIG. 13.

If the adjacent wireless node (mediating wireless node) broadcasts a time record request packet as indicated in RT91 and RT92 at the time "TM91" in FIG. 13, the time record request packet arrives at the wireless node and the higher-level adjacent wireless node at the same time in the same propagation time (e.g., 1 second in FIG. 13).

The times "TM92" and "TM93" (the times of reception of the time record request packet) are recorded in the wireless node and the higher-level adjacent wireless node.

At this time, the time of the wireless node is 1 second ahead the time of the higher-level adjacent wireless node and therefore the recorded time "TM92" is "0:03" of the wireless node time and the recorded time "TM93" is "0:02" of the higher-level adjacent wireless node time.

Further, the higher-level adjacent wireless node transmits time notification packet containing the recorded time of reception of the time record request packet as indicted in TN91 at the time "TM94" in FIG. 13, and then the time notification packet arrives at the wireless node in the propagation time (e.g., 1 second in FIG. 13).

Time difference ΔT is obtained by subtracting the time of reception of the time record request packet recorded by the wireless node itself from the time of reception of the time record request packet recorded in the higher-level adjacent wireless node. In the example shown in FIG. 13, the time difference ΔT is obtained as follows.

$$\Delta T = 0{:}02 - 0{:}03 = -0{:}01 \qquad (4)$$

The time difference ΔT is added to the current time, for example, time "0:05" indicated by "TM95" in FIG. 13, whereby it is made possible to correct the current time of the wireless node to "0:04" thereby to synchronize the time with the current time "0:04" of the higher-level adjacent wireless node.

Even if the propagation time of the time notification packet is prolonged as indicated in "TN92" and arrives at the wireless node at the time "TM96", the time of reception of the time record request packet recorded in the higher-level adjacent wireless node does not change, so that precise time synchronization can be performed without receiving any effect of a communication delay, etc.

On the other hand, for example, in the higher-level adjacent wireless node having the synchronized time, the hierarchy information is "1" in the adjacent wireless node having the reference time of the wireless network (the time to synchronize with) and thus the wireless node 3 sets "2" provided by adding "1" to the hierarchy information of the higher-level adjacent wireless node having the synchronized time as the hierarchy information of the wireless node 3.

Consequently, the wireless node for performing time synchronization carries out a neighbor search to select a mediating wireless node, and thus a time record request packet is broadcasted. Then, the wireless node records the time of reception of the time record request packet and transmits a time notification packet, which contains the time of reception of the time record request packet recorded in the higher-level adjacent wireless node, to the wireless node. Then, the wireless node finds the time difference and then adds the time difference to the current time. Therefore, precise time synchronization can be performed without receiving any effect of a communication delay, etc.

In the embodiment shown in FIG. 1, it is assumed that two or more adjacent wireless nodes (a mediating wireless node and a higher-level adjacent wireless node) for returning an adjacent response packet exist. If the number of adjacent wireless nodes for returning an adjacent response packet is 1, although the accuracy is poor, time synchronization is once performed using time synchronization in the related art (SNTP) and then time synchronization can be again performed at a stage where the number of adjacent wireless nodes in the radio wave arrival range increases.

In this case, the synchronization accuracy of the wireless node that performs the time synchronization involves a problem. Thus, the fact that the synchronization accuracy involves a problem may be pointed out explicitly by adopting "11" provided by adding "10," etc., to the hierarchy information of the higher-level adjacent wireless node rather than "2" provided by adding "1" to the hierarchy information of the higher-level adjacent wireless node as the hierarchy information.

If there is no adjacent wireless node for returning an adjacent response packet, transmitting a neighbor search packet may be continued until an adjacent wireless node appears in the radio wave arrival range or the wireless node may be the wireless node whose hierarchy information is "1" with the time of the wireless node as the reference time.

In the description of the embodiment shown in FIG. 1, the adjacent response packet contains the hierarchy information of the adjacent wireless node and the information of the higher-level adjacent wireless node, but may also contain the communication quality at the reception time of the neighbor search packet, the time at which the last time synchronization was performed, etc.

In this case, the wireless node for performing the time synchronization can select a mediating wireless node based not only on the hierarchy information of the adjacent wireless node and the information of the higher-level adjacent wireless node, but also on the communication quality at the reception time of the neighbor search packet, the time at which the last time synchronization was performed, etc.

In the description of the embodiment shown in FIG. 1, upon reception of a neighbor search packet, each adjacent wireless node waits for the predetermined time and then returns an adjacent response packet, but may skip waiting for the predetermined time.

Further, the predetermined time may be set appropriately and an adjacent response packet may be returned from the higher-level adjacent wireless node in the order of the hierarchy information, such as "1," "2," "3," . . . . In this case, the wireless node can select a mediating wireless node based on the adjacent response packets earlier arriving the wireless node, so that the efficiency of the selection processing of the mediating wireless node is enhanced.

The function of recording the time of reception of the time record request packet is implemented as hardware, whereby an error caused by software between the recorded time and the actual time of reception of the time record request packet can be absorbed.

Information such as wireless node start and sleep time period is added to the sequence of time synchronization, whereby power control, etc., of the wireless node can be performed.

The time notification packet may be not only transmitted by direct wireless communications as indicated in "TN81" in FIG. 12, but also transmitted by multi-hop wireless communications of "NN31", "NN32", "ND31" in FIG. 12, for example.

In other words, if "wireless node and mediating wireless node" and "higher-order adjacent wireless node and mediating wireless node" can perform direct wireless communications, "wireless node and higher-order adjacent wireless node" may be multi-hop wireless communications.

While there has been described in connection with the exemplary embodiments of the present invention, it will be obvious to those skilled in the art that various changes and modification may be made therein without departing from the present invention. It is aimed, therefore, to cover in the appended claim all such changes and modifications as fall within the true spirit and scope of the present invention.

What is claimed is:

1. A time synchronization system between wireless nodes, the time synchronization system comprising:
a first wireless node performing time synchronization and mutually connected to a wireless network;
adjacent wireless nodes adjacent to the first wireless node and mutually connected to the wireless network, said adjacent wireless nodes comprising a mediating wireless node and a higher-level adjacent wireless node, wherein (i) the first wireless node broadcasts a neighbor search packet,
(ii) the adjacent wireless nodes receive the neighbor search packet and then returns an adjacent response packet,
(iii) the first wireless node selects the mediating wireless node based on the adjacent response packet and then transmits a mediating request packet to the mediating wireless node,
(iv) the mediating wireless node receives the mediating request packet and then broadcasts a time record request packet,
(v) the first wireless node receives the time record request packet and then records reception time,
(vi) the adjacent wireless nodes receive the time record request packet and then records reception time,
(vii) the higher-level adjacent wireless node transmits a time notification packet containing the reception time to the first wireless node, and
(viii) the first wireless node calculates the difference between the recorded reception time and the reception time contained in the time notification packet and then adds the difference to current time.

2. The time synchronization system of claim 1, wherein the adjacent response packet contains:
   hierarchy information; and
   information on the higher-level adjacent wireless node.

3. The time synchronization system of claim 2, wherein the adjacent response packet contains:
   the communication quality at the time of reception of the neighbor search packet; and
   time at which the last time synchronization was performed.

4. The time synchronization system of claim 1, wherein the time record request packet contains:
   information on the first wireless node; and
   information on the higher-level adjacent wireless node.

5. The time synchronization system of claim 1, wherein the adjacent wireless nodes receiving the neighbor search packet waits for a predetermined time and then returns the adjacent response packet.

* * * * *